United States Patent
Nielsen

(10) Patent No.: US 10,993,023 B2
(45) Date of Patent: Apr. 27, 2021

(54) CONTROL UNIT

(71) Applicant: Bang & Olufsen A/S, Struer (DK)

(72) Inventor: Kaj Nielsen, Thyholm (DK)

(73) Assignee: BANG & OLUFSEN A/S, Struer (DK)

( * ) Notice: Subject to any disclaimer, the term of this patent is extended or adjusted under 35 U.S.C. 154(b) by 162 days.

(21) Appl. No.: 16/433,304

(22) Filed: Jun. 6, 2019

(65) Prior Publication Data

US 2019/0379967 A1 Dec. 12, 2019

(30) Foreign Application Priority Data

Jun. 7, 2018 (EP) ..................................... 18176439

(51) Int. Cl.
*H04R 25/00* (2006.01)
*H04R 1/32* (2006.01)
*F16M 11/12* (2006.01)
*F16M 11/20* (2006.01)

(52) U.S. Cl.
CPC ........... *H04R 1/323* (2013.01); *F16M 11/128* (2013.01); *F16M 11/2071* (2013.01)

(58) Field of Classification Search
CPC combination set(s) only.
See application file for complete search history.

(56) References Cited

U.S. PATENT DOCUMENTS 9,088,852 B2 * 7/2015 Shennib ................. H04R 25/60
2003/0045956 A1   3/2003 Comair et al.

OTHER PUBLICATIONS

Anonymous: "Fritz!Fon C4 Configuration and Operation manual", Jun. 30, 2016, pp. 70, XP055528151, Retrieved from the Internet: URL:http://minitel.se/shop/ws89/49889/art12/156223912-39c9ee-fritzfon-c4_man_en_GB.pdf.
Anonymous: "Displaybeleuchtung beim C4 IP Phone Forum", Aug. 13, 2014, pp. 9, XP055528138, Retrieved from the Internet: URL: https://www.ip-phone-forum.de/thread s/d'isplaybeleuchtung-beim-c4 .?72165I.
European Search Report dated Nov. 29, 2018 in EP Application No. 18176439.0, filed Jun. 7, 2018, pp. 8.

* cited by examiner

*Primary Examiner* — Amir H Etesam
(74) *Attorney, Agent, or Firm* — Berg Hill Greenleaf Ruscitti, LLP

(57) ABSTRACT

Control unit for controlling a parameter in an multimedia system said control unit comprising a bracket where the multimedia system can be manipulated relative to the bracket from a neutral position to an unbalanced position, and where the bracket urges the multimedia system back to the neutral position, and a receiver in the multimedia system registering the manipulation of the multimedia system, whereby the control unit alters the parameter in response to the registration by the receiver.

14 Claims, 8 Drawing Sheets

CONTROL UNIT

CROSS-REFERENCE TO RELATED APPLICATION

This application claims the benefit of and priority to European Application No. 18176439.0, filed Jun. 7, 2018. The entire specification and figures of the above-referenced application is hereby incorporated in its entirety by reference.

FIELD OF THE INVENTION

The present invention is directed at a control unit for controlling a parameter in a multimedia system.

BACKGROUND OF THE INVENTION

In order to provide for example the desired sound rendition of a piece of music a multimedia system needs to be given certain settings, usually settings which are particular for the particular listener. Such settings may include the level of bass, treble balance and volume level, but also other aspects and further specialized settings may be achieved by manipulating an equalizer in order to provide the exact sound reproduction picture which the listener desires.

However, in a number of circumstances, once these settings have been introduced into the multimedia system or a preselected set of parameters has been selected, most of the interaction with a multimedia system is either turning it on and off, selecting previous or next audio track/programme or adjusting the volume control.

It is further quite common to provide a multimedia system with a remote control making it possible to adjust or select the parameters mentioned above from a listening position without actually interacting physically with the multimedia system.

Normally, on a surface of the multimedia system various control buttons and/or displays are provided such that the above parameters may be adjusted and introduced into the multimedia system's control unit in order to achieve the desired sound reproduction.

In this context it should be noted that by multimedia system any type of audio component is to be included in the meaning of multimedia system such as for example but not limited to loudspeaker, receiver, amplifier, equalizer etc.

It is an object of the present invention to avoid providing the surface of a multimedia system with the control means for controlling the multimedia system thereby allowing the multimedia system to have a more "neutral" look and thereby providing improved design possibilities in designing the appearance (and surfaces) of the multimedia system. At the same time the invention desires to provide an intuitive control of the multimedia system such that control of various parameters is obtained in a surprisingly easy fashion.

SUMMARY OF THE INVENTION

The present invention addresses this by providing a control unit for controlling a parameter in an multimedia system said control unit comprising a bracket where the multimedia system can be manipulated relative to the bracket from a neutral position to an unbalanced position, and where the bracket urges the multimedia system back to the neutral position, and a receiver in the multimedia system registers the manipulation of the multimedia system, whereby the control unit alters the parameter in response to the registration by the receiver.

By providing a control unit which due to physical manipulation of the multimedia system, i.e. that the multimedia system is moved relative to its rest position/neutral position, the user will have a clear feeling of manipulating the system and thereby altering the parameter which manipulation of the system is set to cause. The manipulation may for example be switching on the system, adjusting the volume, selecting previous or next audio track/programme, changing playing source, shutting down the system or other such parameter change. In this connection a parameter is any parameter which it is desirable to switch on or off or adjust, for example switching on or off the system, adjusting the volume, adjusting the level of the bass, treble, mute, filters etc.

The manual manipulation of the multimedia system is facilitated by the bracket and the movement is registered by the receiver. The receiver may as set out in a further advantageous embodiment comprise a movement sensor and/or an accelerometer, a gyro and/or gravity sensor and/or a level sensor and/or a microprocessor. In this manner it is possible to register the difference of the multimedia system being in the neutral position and when manipulated into a non-balanced position. As the multimedia system is moved out of the neutral zone also the extent of the movement may be registered and used as an input by the receiver.

Hence, the control unit registers the relative movement of the sensor relative to a neutral position.

In a still further advantageous embodiment the bracket is suitable for mounting said multimedia system to a vertical surface. Many multimedia systems are simply placed on a table top, but with the present system it is also foreseen that the bracket may be suitable to mount the system on a vertical surface such as for example a wall, pillar or the like.

An embodiment of this bracket suitable to be mounted on a vertical surface discloses that the bracket comprises two sub-bracket parts which sub-bracket parts can pivot relative to each other around a pivot point, and where a first set of resilient means and a second set of resilient means are arranged between said two sub-bracket parts, one set of resilient means on either side of an axis going through the pivot point, said first set of resilient means in use arranged above said second set of resilient means, such that in use as the multimedia system is manipulated upwards the first set of resilient means is compressed and the second set of resilient means is stretched, such that as the multimedia system is released from the force manipulating the multimedia system upwards, the multimedia system will return to a neutral position, and when the multimedia system is manipulated downwards the first set of resilient means is stretched and the second set of resilient means is compressed, such that as the multimedia system is released from the force manipulating the multimedia system downwards, the multimedia system will return to a neutral position.

As gravity will influence the multimedia system when it is arranged on a vertical surface it is necessary to provide the resilient means in the first and second set such that when the multimedia system is not manipulated, the resilient means will maintain the multimedia system in a neutral position, i.e. countering the influence of gravity such that a user manipulating the system will both be able to manipulate the system upwards and downwards whereby the first and second set of resilient means are activated. The resilient means are designed such that a relatively small force shall be used in order to lift the multimedia system—the force not corresponding to the actual lifting force necessary to move the multimedia system against the influence of gravity.

In practice the second set of resilient means arranged below the first set of resilient means will be stiffer than the upper resilient means, i.e. the first set of resilient means, in order to counter the influence of gravity. As the multimedia system is manipulated it will pivot around a pivot point which pivot point may be decided according to the detailed design of the bracket.

In practice the pivot point may be in the shape of an axle connecting the two bracket parts, but also axle free brackets are contemplated where the pivot point will be through an axis and even the axis may be movable such that no constant pivot point is present.

The pivot points and embodiments will be explained below in the detailed description.

In a still further advantageous embodiment of the invention the bracket is a floor stand allowing said multimedia system to be placed on a horizontal surface.

As an alternative to hanging the multimedia system on a vertical surface the multimedia system may be placed on a horizontal surface. In this connection floor stand shall be construed as any stand which is suitable to be placed on a horizontal surface. The system is advantageously provided with a sensor such that the neutral position is registered and used as neutral position. This is important in that "a horizontal surface" may not be exactly level, but may be out of level, and still be considered generally as a horizontal surface. Examples of horizontal surfaces which are not exactly level may be floors in older buildings, shelves not levelled properly etc.

An embodiment of such a floor stand foresees that the bracket comprises two sub-bracket parts where the sub-bracket parts can pivot relative to each other around a pivot point, and where a first set of resilient means and a second set of resilient means are arranged between said two sub-bracket parts and on either side of an axis going through said pivot point, such that if the multimedia system is manipulated out of a neutral position one of the sets of resilient means will urge the multimedia system back into the neutral position.

In this particular embodiment the resilient means may be identical in that it is desirable to position the multimedia system in a neutral position where it urges or loads the resilient means on either side of the pivot point equally in order to balance the multimedia system.

In another advantageous embodiment where the bracket is a floor stand the bracket comprises two sub-bracket parts where the sub-bracket parts can pivot relative to each other around a pivot point, and where the point of gravity of the multimedia system is below the pivot point.

When the pivot point is above the point of gravity of the multimedia system the multimedia system will tend to be urged towards a neutral position by gravity.

In this manner the point of gravity of the multimedia system defines the neutral position and it will not be necessary to provide any means to urge the multimedia system back into the neutral position if it has been manipulated by a user out of the neutral position.

Also in a variation of this embodiment the bracket, or sub-bracket parts will extend outside the housing in order to maintain the bracket in contact with the floor or surface, as the housing is rolled to one side. During this movement the rolling action will urge one side of the bracket or a sub-bracket into the housing (or at least flush with an outer surface of the housing) while resilient means in the other end of the bracket or the other sub bracket will urge the bracket or sub-bracket to remain in contact with the surface.

In a still further advantageous embodiment of the invention the manipulation of the multimedia system causing the registration by the receiver may vary in time such that a longer maintained displacement of the multimedia system causes a corresponding longer change in the parameter, and/or that the velocity and/or extent/amplitude of the displacement causes a corresponding faster change in the parameter and/or where the displacement direction relative to the pivot point determines the change in the parameter.

For example, where the receiver comprises an accelerometer and/or a gyro, it is possible to register the velocity with which the multimedia system is manipulated out of the neutral position and thereby translate this into a faster parameter change. Also the extent to which the manipulation is carried out may determine the degree of the parameter change or even the type of parameter which is manipulated.

Generally, a gyro sensor or angular rate sensor or angular velocity sensor is a device that can sense angular velocity. Gyro sensors can sense rotational motion and changes in orientation and therefore augment motion. Vibration gyro sensors can sense angular velocity due to the Coriolis force which is applied to a vibrating element. This motion produces a potential difference from which angular velocity is sensed. The angular velocity is converted into an electrical signal output. This is the signal which may be used to register the movement of the multimedia system being manipulated from its neutral position.

One of the challenges with this mechanical manipulation of a multimedia system's control unit is to distinguish between manipulating one parameter or another parameter. Furthermore, the selection of the parameter may also be a question.

In the basic version the parameter may be on/off of the system such that for example by manipulating the system downwards or to one side the system is turned on and by manipulating the system upwards or to the other side the system is switched off again.

This is a single parameter manipulation, but a double parameter manipulation may for example be that manipulation to one side switches the system on and off and manipulation to the other side increases the volume. After a certain rest period (while the system is turned on and set at the desired volume) further manipulation will either increase or decrease volume depending on which direction the multimedia system is manipulated. These manipulations may naturally also be combined with "click" functions, or displacement of the multimedia system towards the bracket (see below). In further advanced control regimes the duration and speed of the manipulation may also indicate selection of a specific parameter such that for example a rapid relatively small manipulation to one or the other side (a sort of click function) may switch the control unit to adjust another parameter such as for example if one click (rapid movement of the multimedia system in one direction) changes the parameter from being on/off to for example volume control after which manipulation of a longer duration to one or the other side may adjust the volume control, for example up or down.

In this context it is also foreseen, particularly in embodiments when the sub-bracket parts are not connected by axles, to be able to move the multimedia system towards the bracket, i.e. a substantially linear movement against the forces exerted by the resilient means.

A further click may naturally switch the control unit back to the original parameter, for example on or off or a double click may switch to a different audio source etc. In this manner it is possible to allow the simple mechanical system to control a number of parameters by manipulating the multimedia system whereby the receiver is moved relative to the bracket.

In a still further advantageous embodiment the bracket comprises a damping mechanism acting to dampen the movement of the multimedia system back towards the neutral position, such that the multimedia system does not substantially pass the neutral position.

In order for the mechanical system to provide a single recognizable input to the receiver it is necessary that the multimedia system returns to the neutral position without swinging back and forth around the neutral position in order to provide a precise input to the receiver such that the appropriate adjustment of the parameter may be effected. The swinging back and forth around the neutral position may generate false inputs. Naturally a neutral zone around the neutral position may be provided such that a limited over-shoot is allowed. However by providing a damper, a controlled return to the neutral position may be designed.

For this purpose it is desirable to dampen the movement of the multimedia system such that it does not move substantially past the neutral position once it has been manipulated away from the neutral position into an unbalanced position.

In embodiments of the damping mechanism which will be explained in detail below in the detailed description the damping mechanism comprises either a rotational damper, a piston damper, a step motor, a mechanical or electrical linear actuator.

In some embodiments the housing adjacent the bracket, or the part of the bracket extending outside the housing, may be provided with stoppers. The stoppers are provided such that a limit is established on the housing's ability to roll to either side. Typically the stoppers are made from a modified rubber or a polymer. However, also other materials may be contemplated.

Generally, for all embodiments the feeling a user will experience when manipulating the multimedia system, may be provided with a tactile feel, such that the user will experience a definite sense of moving the multimedia system, thereby manipulating a parameter.

BRIEF DESCRIPTION OF THE DRAWINGS

The invention will now be described with reference to the accompanying drawing wherein.

DETAILED DESCRIPTION OF THE INVENTION

Figure 1:
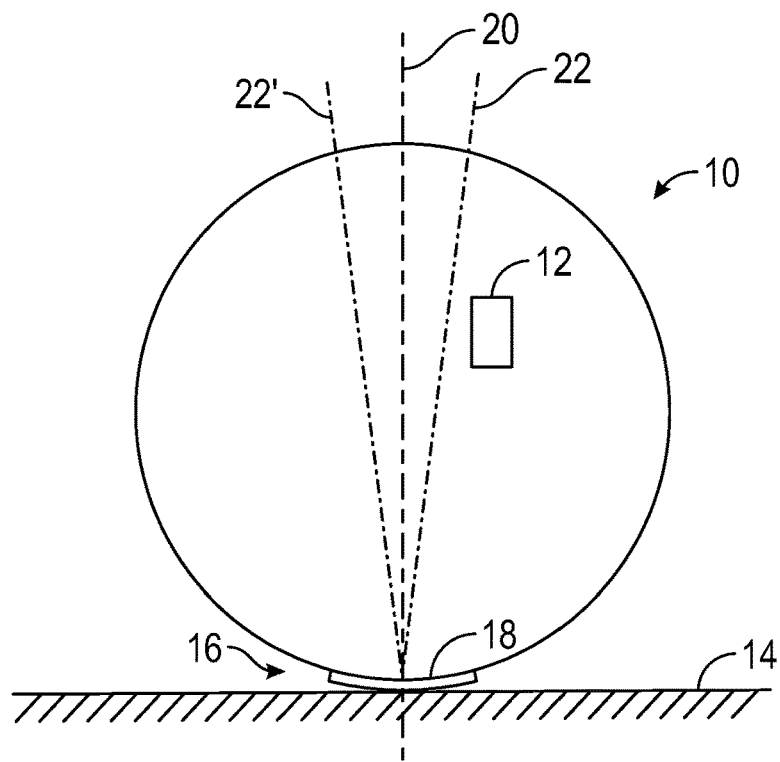
FIG. 1 illustrates a multimedia system provided with a receiver

In FIG. 1 is schematically illustrated a multimedia system 10 provided with a receiver 12 arranged inside the multimedia system 10. The multimedia system 10 is in this embodiment positioned on a horizontal surface 14 by means of a floor stand 16. The multimedia system 10 comprises a bracket 18 which in this embodiment is part of the floor stand 16 such that the multimedia system 10 will be resting on the bracket 18 (same as the floor stand 16).

When untouched the multimedia system 10 will achieve a neutral position indicated by the line 20. In this neutral position 20 the multimedia system 10 will rest substantially on a central part of the bracket 18. By manipulating the multimedia system 10 to one or the other side into an unbalanced position indicated by the dashed lines 22, 22' the multimedia system 10 will slightly roll on the floor stand 16/bracket 18.

This movement, i.e. the movement from the neutral position 20 into the unbalanced position 22, 22' will be registered by the receiver 12 as input to the control unit such that the control unit will alter a parameter of the multimedia system 10 in response to the input registered by the receiver 12 caused by the movement of the multimedia system 10 from the neutral position 20 to one of the unbalanced positions 22, 22'.

In this example the multimedia system 10 is illustrated as a circular device, but any shape of device may be used with the present invention. The core of the present invention is the fact that a mechanical manipulation of the multimedia system 10 from a neutral position 20 to an unbalanced position illustrated as 22 and 22' is registered by a receiver 12 and translated into control or change of a parameter in the sound system/multimedia system 10.

The parameter may be any parameter such as for example on/off, volume level, audio track/programme, media source or any other parameter which it is desirable to control in the system in which the control unit is incorporated. In order to ease the manipulation of the multimedia system 10 the present embodiment illustrates the floor stand/bracket 18 having a substantially partly circular surface on which the multimedia system may roll.

As will be evident from the description below this is not necessary and as will be explained with reference to other embodiments the bracket 18 may be fastened to the surface 14.

In this embodiment it is contemplated that the weight distribution of the multimedia system 10 is such that the point of gravity will return the multimedia system 10 to its neutral position 20 once manipulation of the multimedia system 10 is released, i.e. that left alone the multimedia system 10 will return to the neutral position 20.

In other instances the weight distribution in the multimedia system 10 may be such that it will not return to the neutral position 20 by itself. For these purposes the bracket 18 may have a different configuration as will be explained with reference to FIG. 2.

Figure 2:
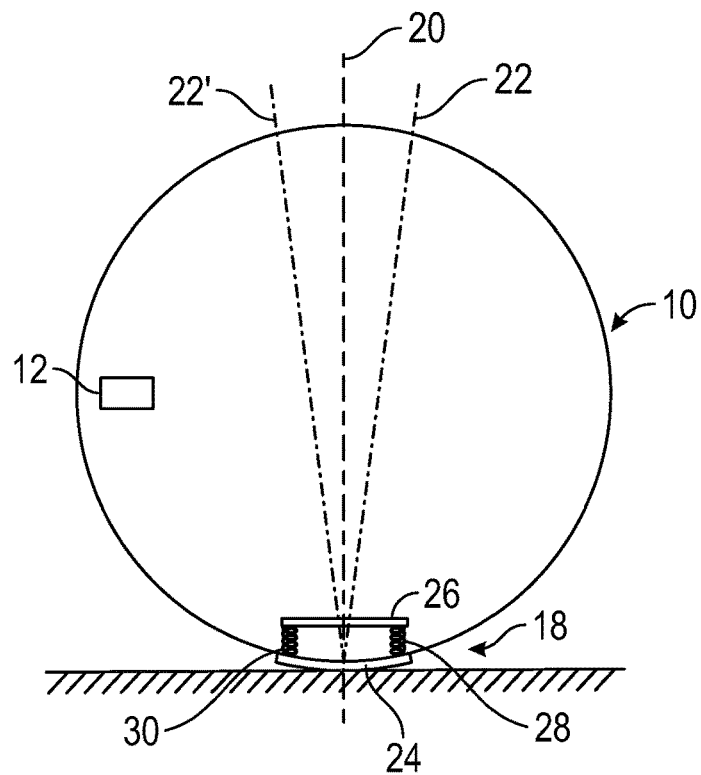
FIG. 2 illustrates an embodiment of the multimedia system where the bracket comprises two sub-bracket parts

In FIG. 2 is illustrated an embodiment where the bracket 18 comprises two sub-bracket parts 24, 26. The sub-bracket parts 24, 26 are connected by a first and second set of resilient means 28, 30. The resilient means may for example be helical springs, but also other means which can provide the effect which will be discussed below are contemplated within the term resilient means.

The lower sub-bracket part 24 is not necessarily connected to the multimedia system 10 directly, but only through the second sub-bracket part 26. The connection between the two sub-bracket parts 24, 26 may be solely the resilient means 28, 30, but also other movable mechanical means may be interposed between the two sub-bracket parts for other purposes as will become evident below.

The resilient means 28, 30 are selected such that they when the multimedia system 10 is not manipulated it will remain in its neutral position indicated by the dashed line 20. If the multimedia system 10 is manipulated towards one of the unbalanced positions 22, 22' one side of the resilient means 28, 30 will be compressed whereas the other side will be stretched such that as the manipulative force is released from the multimedia system 10 the resilient means 28, 30 will urge the multimedia system 10 back into the neutral position 20.

With this configuration it is not necessary to distribute the weight evenly in the multimedia system 10 in that simply by designing the first and second set of resilient means 28, 30 appropriately substantially any weight distribution inside the multimedia system 10 may be compensated by the resilient means 28, 30 such that the multimedia system 10 after manipulation will return to the neutral position 20.

This also provides the possibility to arrange the receiver 12 in any desirable position or suitable position inside the multimedia system 10.

Figure 3:
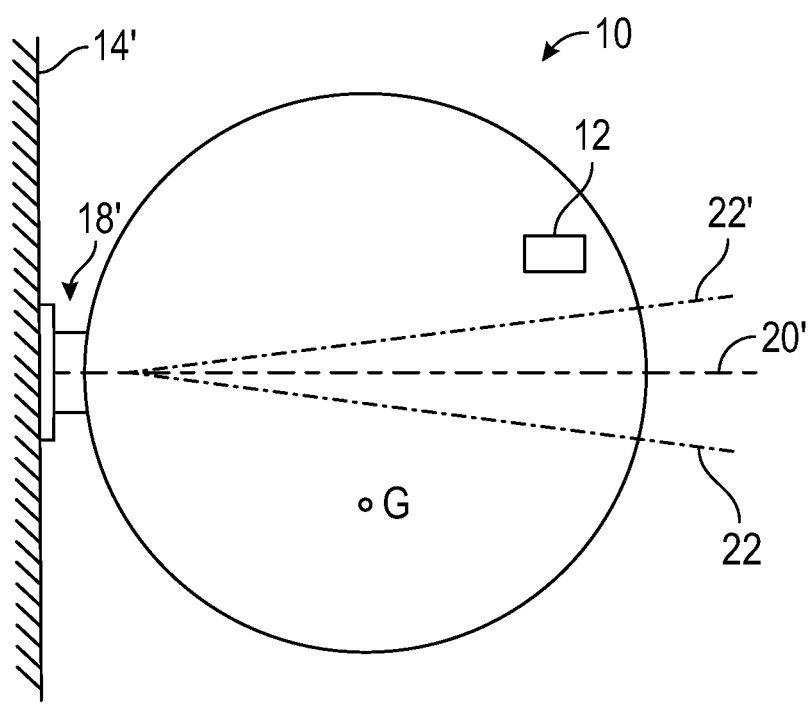
FIG. 3 illustrates an embodiment of the invention where the multimedia system is mounted on a vertical surface

In FIG. 3 is illustrated an embodiment of the invention where the multimedia system 10 is mounted on a vertical surface 14'. In this configuration it is clear that the centre of gravity G of the multimedia system 10 is not able to be designed to ensure that the multimedia system 10 returns to the neutral position indicated by the dashed line 20'. Consequently, the mounting bracket 18' must be provided with means for compensating for the effect of gravity such that the multimedia system 10 will remain in a neutral position 20' when not being manipulated.

Figure 4:
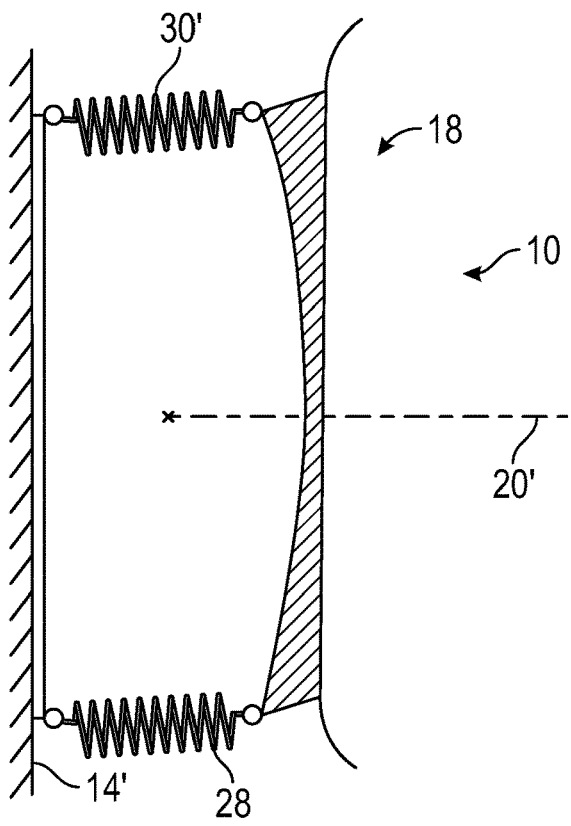
FIG. 4 illustrates a suitable mounting bracket in the neutral position
Figure 5:
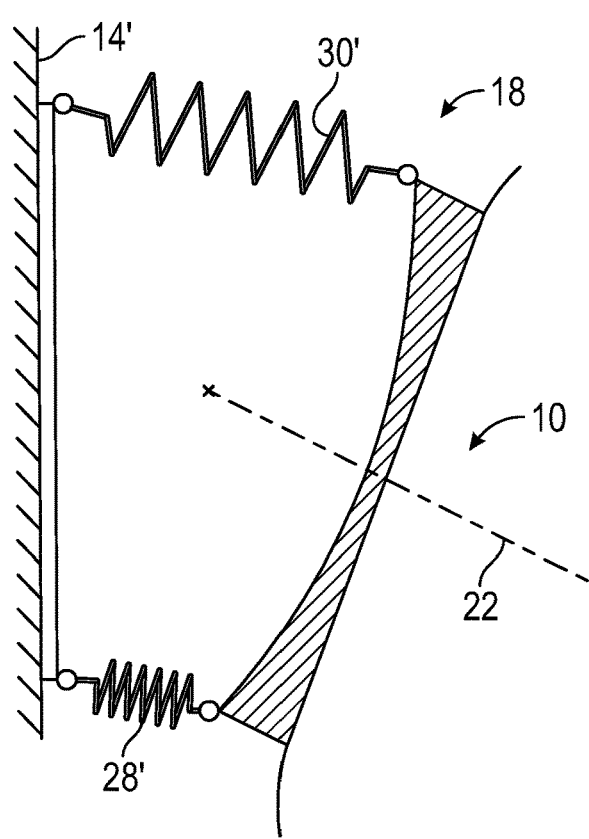
FIG. 5 illustrates a suitable mounting bracket in a manipulated position

Turning to FIGS. 4 and 5 a suitable mounting bracket 18' is illustrated in FIG. 4 in the neutral position and in FIG. 5 in a manipulated position corresponding to the unbalanced position 22. In order to be able to maintain the multimedia system 10 in the neutral position 20' the first set of resilient means 28 will be substantially stiffer than the second set 30' of resilient means in order to compensate for the effect of gravity.

As the multimedia system 10 is manipulated into an unbalanced position indicated by the dashed line 22 the first set of resilient means 28' are compressed as illustrated in FIG. 5 and at the same time the second set of resilient means 30' are stretched in order to compensate for the compression.

The first set of springs 28' will typically be compression springs whereas the second set of springs 30' will be tension springs.

In embodiments where helical springs are used as resilient means 28', 30' the spring characteristics may be designed to allow for the multimedia system 10 to attain various unbalanced positions 22, 22' depending on the spring characteristics. On the other hand, the spring characteristics may also be used in order to determine where it is desirable to position the pivot point illustrated by the X along the dashed lines.

In some applications it may be interesting to provide the pivot point X as close to the wall/surface 14, 14' as possible whereas in other embodiments it might be desirable to provide a distance between the pivot point X and the surface 14, 14'.

As the resilient means will urge the multimedia system 10 back into a neutral position there is a risk that when the manipulative force is released from the multimedia system 10, for example in the unbalanced position 22, the multimedia system 10 will spring/bounce back towards the neutral position 20' and pass the neutral position 20' and thereby come close to the position indicated by the dashed line 22' in FIG. 3. This may create an undesirable input registered by the receiver which then changes a parameter which it was not desirable to change at that time. For this reason it is desirable to dampen the movement particularly when the resilient means are in the shape of springs such that as the multimedia system 10 moves back into the neutral position 20 the pendulum action around the neutral position 20 is minimized or altogether avoided. For this purpose the invention provides a damping mechanism arranged inside the bracket 18 such that this unwanted movement is avoided.

In one embodiment as will be described with reference to FIG. 6 a principle of the damping construction for a floor stand is illustrated.

The features already mentioned above and provided with reference numbers are denominated by the same reference numbers in the following description.

Figure 6:
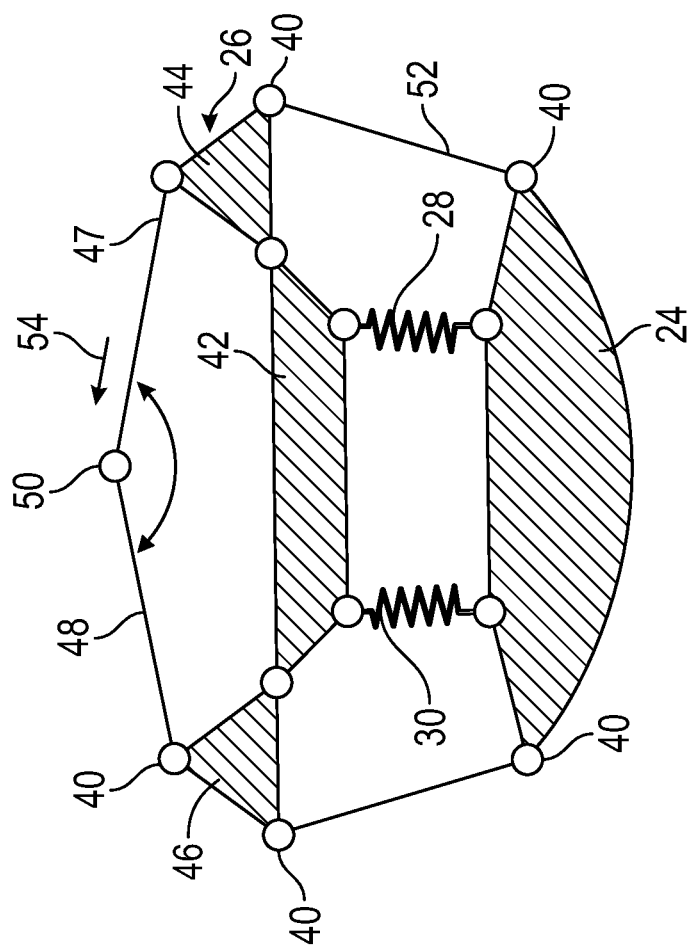
FIGS. 6 and 7 illustrate the principle of a floor bracket damping construction

The damping construction illustrated in FIG. 6 is provided with a lower sub-bracket part 24 which is connected to an upper sub-bracket part 26 by means of the first and second resilient means 28, 30. The upper sub-bracket part 26 comprises a first fixed part 42 pivotally connected to load transfer members 44, 46 which by means of connection rods 47, 48 are connected to a damper 50.

Further, a number of pivot points 40 are provided such that movement of the lower sub-bracket part 24 relative to the fixed part 42 of the upper sub-bracket part 26 may be translated into movement of the damper 50. For example, if a force is applied such that the first resilient means 28 is compressed (and the second resilient means 30 is stretched) the connection rod 52 will urge the load transfer member 44 to pivot about the pivot point connecting the load transfer member 44 to the fixed part 42 thereby pushing the connection rod 47 in the direction indicated by the arrow 54. This movement will cause the damper 50 to be rotated whereby the damper 50 is effectuated resisting the movement or at least slowing the movement down which effectively will cause the return of the multi-media system 10 going from the unbalanced position 22, 22' back to the neutral position 20 much slower and in a more determined manner.

Likewise, if a force is introduced compressing the second resilient means 30 and stretching the first resilient means 28 the same force transfer will occur urging the damper 50 to dampen the movement in the opposite direction. However, in order to use a damper 50 which only dampens in one direction the connection rods 47, 48 are attached to different parts of the damper 50 as illustrated with reference to FIG. 7.

Figure 7:
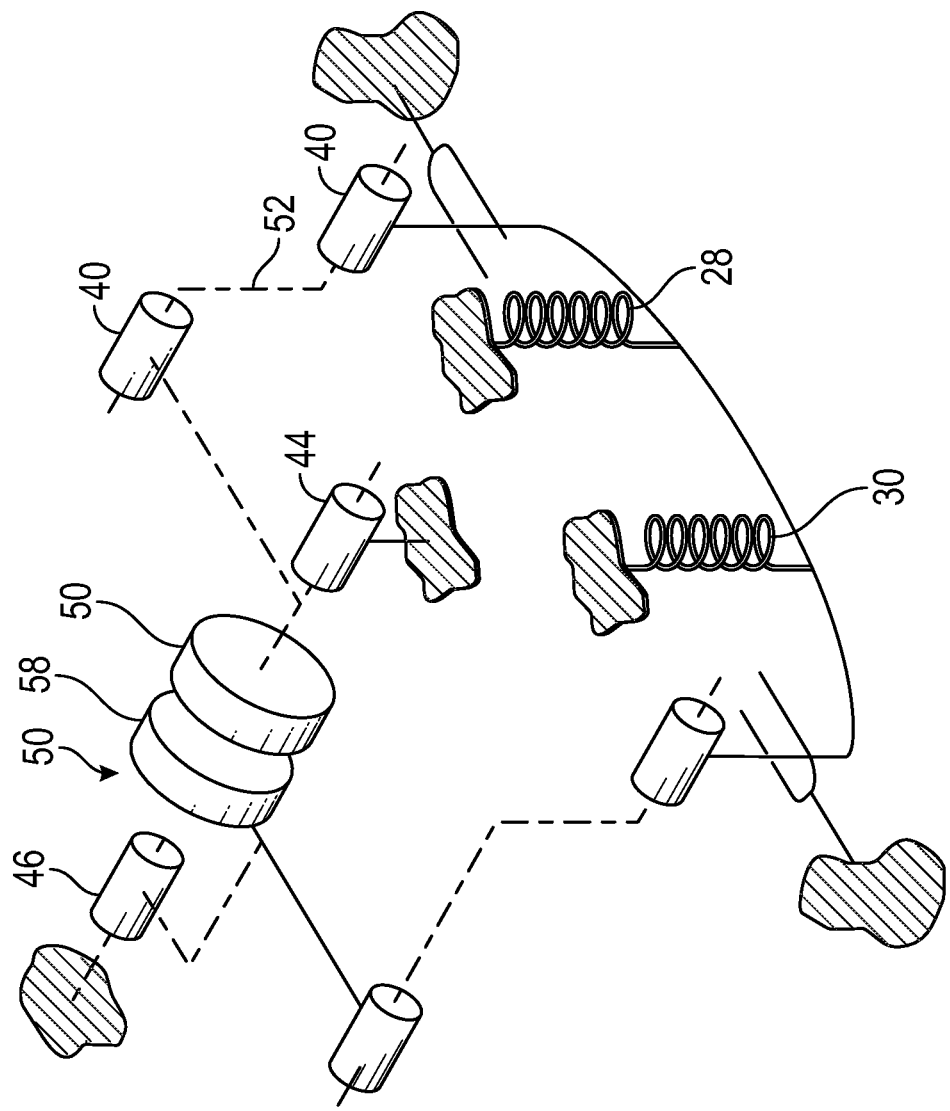

As is evident in FIG. 7 the damper 50 has two parts 56, 58 which are connected to opposing sides of the damper mechanism such that the resulting force into the damper 50 creates a singular rotational movement in one direction providing damping regardless of the direction in which the bracket overall is influenced, i.e. whether it is in the unbalanced direction 22 or the other unbalanced direction 22' (see FIG. 1).

The embodiment described above with reference to FIGS. 6 and 7 are particularly useful when used in connection with placing the multimedia system 10 on a horizontal surface 14.

In order to dampen the movement of a multimedia system 10 arranged on a vertical surface 14' another construction of the damping mechanism may be contemplated. This mechanism will be discussed with reference to FIGS. 8A-8C. In this embodiment the sub-bracket part 26 is provided with a surface 60 facing the other sub-bracket part 24 which surface 60 has a curved shape. The curved shape may be part of a circle or may be another well-defined curve.

Between the two sub-bracket parts 24, 26 is arranged a damping mechanism 62. The two sub-bracket parts 24, 26 are connected by a connection rod 64 which connection rod is provided with a pivot point 65 such that the two sub-bracket parts 24, 26 may pivot around the pivot point 65. Furthermore, a linear damper 68 (comprising a helical spring 72) connected with a further pivot point 67 to the connection rod 64 is arranged such that the linear damping mechanism 62 which is provided with a roller 70 which roller by means of a spring 72 is urged against the curved surface 60.

Figure 8B:
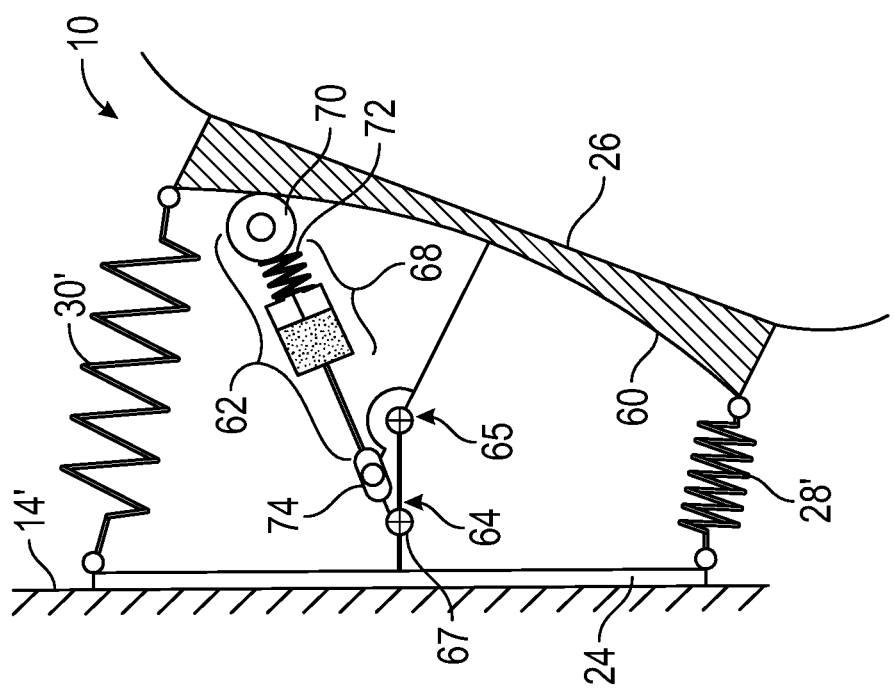
FIGS. 8A-8C illustrate the principles of a wall bracket construction.
Figure 8A:
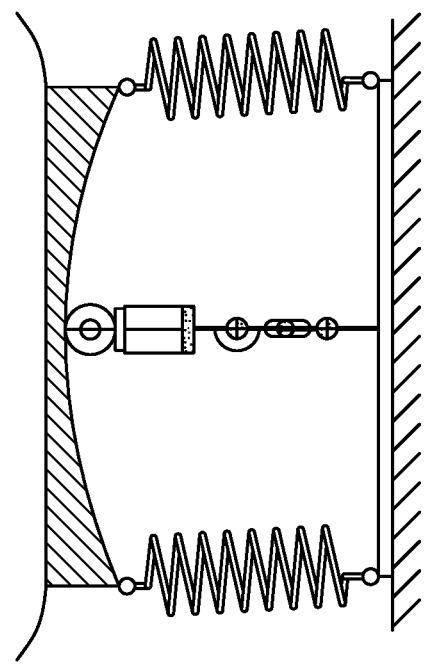

In the unbalanced position illustrated in FIG. 8A where the multimedia system 10 has been manipulated downwards into the unbalanced position 22, see FIG. 3, the linear damper 68 has been extended (due to the influence of the spring 72). As the multimedia system 10 moves back towards the neutral position 20 due to the spring force in the lower resilient means 28', the roller 70 will roll around the curved surface 60 thereby compressing the spring 72 and potentially gas if the damping mechanism 62 is provided with a gas linear damper 68 as well.

The energy needed to compress the spring 72 and the linear damper 68 will dampen the movement of the multimedia system 10 such that the balance in the neutral position 20 will be achieved without the multimedia system 10 swinging back and forth (repeatedly) around the neutral position 20.

It is clear that if the multimedia system 10 is lifted upwards towards the unbalanced position 22' the damping mechanism 62 will swing downwards whereby the roller 70 will roll on the lower part of the curved surface 60 providing exactly the same mechanical damping as described above. The damping mechanism 62 is furthermore provided with a special rotation mechanism 74 such that the linear damping mechanism 62 may effortlessly swing along the curved surface 60 without interfering with the pivot point 65 of the multimedia system 10. The special rotation mechanism 74 is also provided in order to force the damping mechanism 62 in the opposite direction.

Figure 8C:
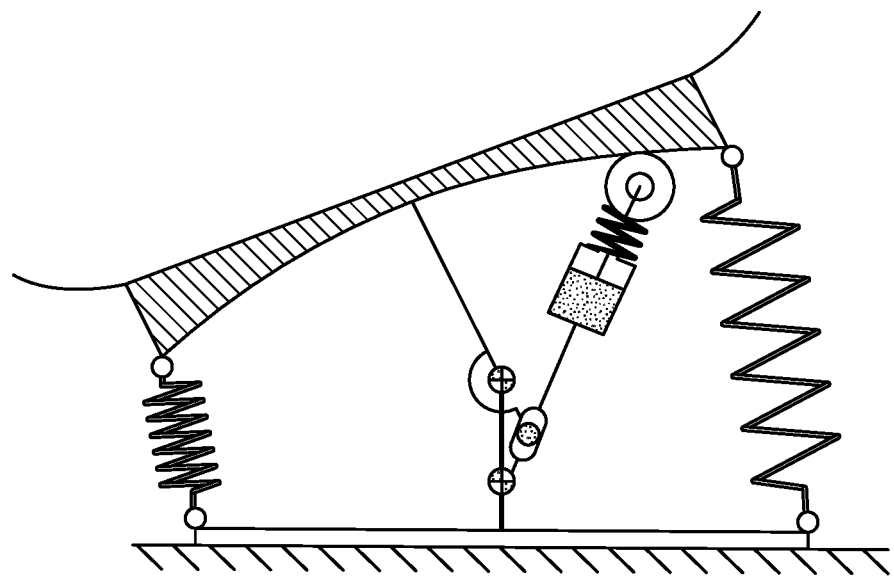

In FIGS. 8B and 8C is illustrated the above described mechanism in a neutral position, see FIG. 8B, and in a position where the multimedia system 10 has been moved upwards to the unbalanced position 22' (see FIG. 3).

Figure 9:
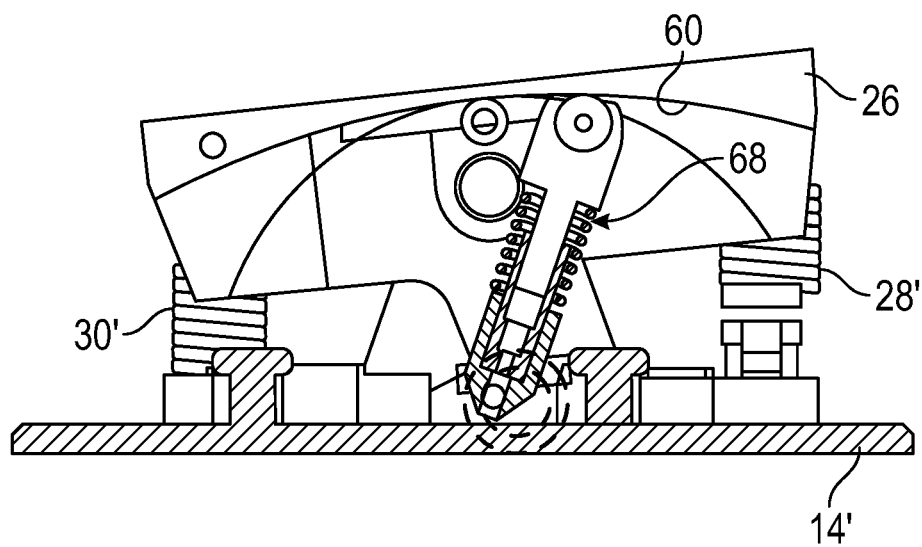
FIG. 9 illustrates the principles of another wall bracket construction.
Figure 10A:
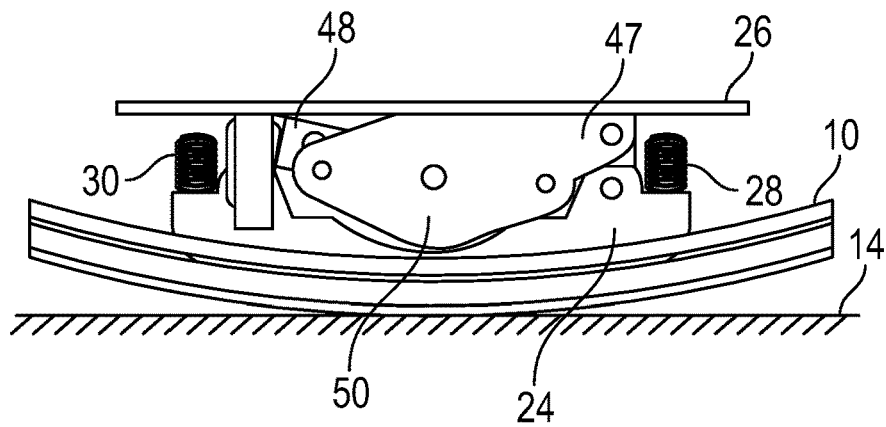
FIGS. 10A-10B illustrate the damping mechanism for a floor stand.
Figure 10B:
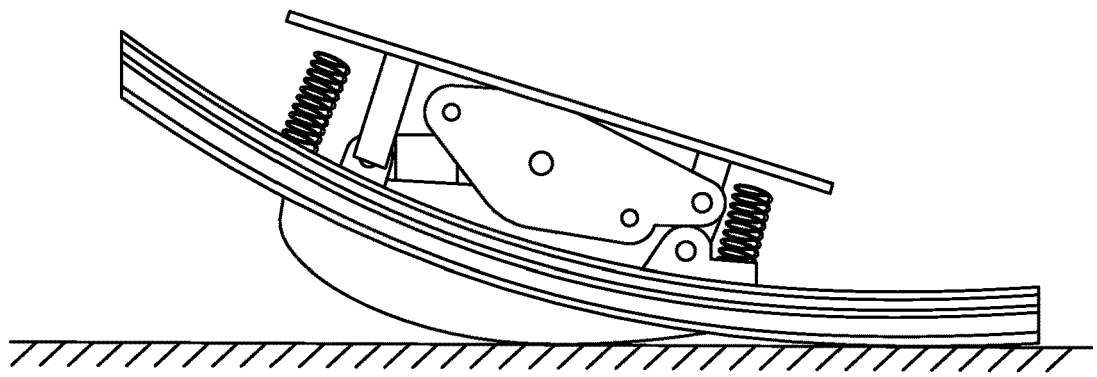

In FIG. 9 is illustrated how the damping mechanism as described with reference to FIGS. 8A-8C in practice can be/is constructed. Similarly, in FIGS. 10A and 10B the damping mechanism for a floor stand as described with reference to FIGS. 6 and 7 is illustrated in some detail on how it can/will be conceived in practice.

For illustrative purposes a number of parts and features not pertinent with respect to the present invention have been removed.

Figure 11:
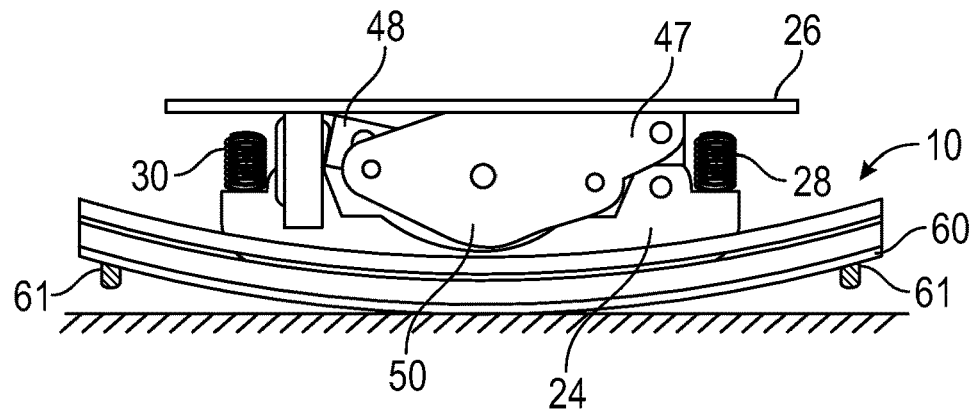
FIG. 11 illustrates stoppers mounted on the housing to limit the sideways roll of the system.

In FIG. 11 is illustrated a particular feature applicable in some embodiments. Adjacent the foot bracket 24 on the housing 60 is provided stoppers 61. The stoppers 61 serve to limit how far the multimedia system may roll to either side. Typically the stoppers 61 are made from a soft non-skid, non-mark compound, typically polymer based.

The invention claimed is:

1. A multimedia system comprising a control unit for controlling a parameter in said multimedia system, said control unit comprising:
   a bracket allowing the multimedia system to be arranged on or against a surface where the multimedia system can be manipulated relative to the bracket from a neutral position to an unbalanced position;
   wherein resilient means in the bracket and/or gravity urge the multimedia system back to the neutral position; and
   wherein a receiver in the multimedia system registers the manipulation of the multimedia system, whereby the control unit alters the parameter in response to the registration by the receiver.

2. A multimedia system according to claim 1 wherein:
   the receiver comprises at least one of a movement sensor, an accelerometer, a gyro, a gravity sensor, an angle sensor, a level sensor, or a microprocessor.

3. A multimedia system according to claim 1 wherein:
   the bracket is suitable for mounting said multimedia system to a vertical surface.

4. A multimedia system according to claim 3, wherein:
   the bracket comprises two sub-bracket parts that can pivot relative to each other around a pivot point, and where a first set of resilient means and a second set of resilient means are arranged between said two sub-bracket parts, one set of resilient means on either side of an axis going through the pivot point, said first set of resilient means in use arranged above said second set of resilient means, such that in use as the multimedia system is manipulated upwards, the first set of resilient means are compressed and the second set of resilient means are stretched, such that as the multimedia system is released from a force manipulating the multimedia system upwards, the multimedia system will return to a neutral position, and when the multimedia system is manipulated downwards the first set of resilient means is stretched and the second set of resilient means is compressed, such that as the multimedia system is released from the force manipulating the multimedia system downwards, the multimedia system will return to a neutral position.

5. A multimedia system according to claim 1 wherein:
   the bracket is a floor stand allowing said multimedia system to be placed on a horizontal surface.

6. A multimedia system according to claim 5, wherein:
   the multimedia system is enclosed in a housing, and where a part of the bracket extends outside said housing, where the bracket at least comprises two resilient means, such that a first resilient means is compressed when the housing is manipulated in one direction where the second resilient means is extended, such that the bracket stays in contact with the floor, and where the point of gravity of the multimedia system will urge the multimedia back to a neutral position.

7. A multimedia system according to claim 5 wherein:
   the bracket comprises two sub-bracket parts that can pivot relative to each other around a pivot point, and where a first set of resilient means and a second set of resilient means are arranged between said two sub-bracket parts and on either side of an axis going through said pivot point, such that if the multimedia system is manipulated out of a neutral position, one of the sets of resilient means will urge the multimedia system back into the neutral position.

8. A multimedia system according to claim 5 wherein:
the bracket comprises two sub-bracket parts that can pivot relative to each other around a pivot point, and where the point of gravity of the multimedia system is below the pivot point.

9. A multimedia system according to claim 1, wherein:
the manipulation of the multimedia system causing the registration by the receiver may vary in time such that a longer maintained displacement of the multimedia system causes a corresponding longer change in the parameter, and/or that the velocity and/or extent/amplitude of the displacement causes a corresponding faster change in the parameter and/or where the displacement direction relative to the pivot point determines the change in the parameter.

10. A multimedia system according to claim 1 wherein:
the bracket comprises a damping mechanism acting to dampen the movement of the multimedia system back towards the neutral position, such that the multimedia system does not substantially pass the neutral position.

11. A multimedia system according to claim 10 wherein:
the damping mechanism comprises either a rotational damper, a linear damper, a step motor, a mechanical or electrical linear actuator.

12. A multimedia system according to claim 1 wherein:
the multimedia system adjacent the bracket when it is gravity that urge the multimedia system back to the neutral position, is provided with projecting stops, hindering the multimedia system in being manipulated past the projecting stops arranged on either side of the bracket.

13. A multimedia system according to claim 1, wherein:
the resilient means is selected among springs, including at least one of helical springs, gas springs, liquid springs, elastic polymer compounds, rubber elastic polymer compounds, or modified rubber elastic polymer compounds.

14. A method of controlling a multimedia system, where said multimedia system comprises: a bracket; a receiver cooperating with the bracket; and wherein when physically displacing the multimedia system from a neutral position, the receiver will recognize the displacement and translate the displacement into a change of a parameter, and when said multimedia system is released from being displaced, the multimedia system will return to the neutral position by resilient means in the bracket and/or gravity urge, thereby ending the change of the parameter.

* * * * *